United States Patent
Pruden et al.

(10) Patent No.: US 7,329,118 B2
(45) Date of Patent: Feb. 12, 2008

(54) NOZZLE AND APPARATUS FOR INJECTION MOLDING

(75) Inventors: Trevor Pruden, Windsor (CA); Fred Steil, Lake Orion, MI (US)

(73) Assignee: D-M-E Company, Madison Heights, MI (US)

(*) Notice: Subject to any disclaimer, the term of this patent is extended or adjusted under 35 U.S.C. 154(b) by 256 days.

(21) Appl. No.: 11/271,084

(22) Filed: Nov. 12, 2005

(65) Prior Publication Data

US 2007/0110843 A1    May 17, 2007

(51) Int. Cl.
*B29C 45/22* (2006.01)
(52) U.S. Cl. ............... 425/563; 425/568; 425/569; 425/572
(58) Field of Classification Search ........ 425/563, 425/568, 569, 571, 572
See application file for complete search history.

(56) References Cited

U.S. PATENT DOCUMENTS

| | | |
|---|---|---|
| 3,843,294 A | 10/1974 | Blelfeldt et al. |
| 3,934,626 A | 1/1976 | Hall |
| 4,588,367 A | 5/1986 | Schad |
| 7,189,071 B2 * | 3/2007 | Olaru .................. 425/563 |

\* cited by examiner

*Primary Examiner*—Tim Heitbrink
(74) *Attorney, Agent, or Firm*—John W. Gregg

(57) ABSTRACT

An expansion nozzle for conducting melt from a floating manifold to a mold assembly comprises a bushing having a bushing flange and spigot having a passage therethrough joining a nozzle inlet and an outlet, a head having a seating surface and a bore through the head slidably receiving the spigot so that the spigot is movable relative to the head over a range from abutting contact of opposing surfaces of the head and bushing flange to a limit of axial separation of the opposing surfaces, axial separation of opposing surfaces of the head and bushing flange being maintained throughout an operating temperature range. Springs maintain sealing contact of a seating surface of the head with a mating surface of the mold assembly. Advantageously, a locating ring provides a reaction surface for the springs and supports the head to resist moments arising from axial misalignment of the expansion nozzle and mold assembly.

20 Claims, 3 Drawing Sheets

NOZZLE AND APPARATUS FOR INJECTION MOLDING

I. BACKGROUND OF THE INVENTION

1. Field of the Invention

This invention relates generally to injection molding. In particular, this invention relates to nozzles for controlling flow of melt through conduits between an injection unit and mold cavities.

2. Description of Related Art

Injection molding is a cyclic process wherein flowable material, e.g. molten metal, rubber or thermoplastic (known as "melt") is forced into mold cavities having the shape and size of articles to be molded and allowed to solidify; the molded articles are removed from the mold cavities and the process is repeated. Mold assemblies defining mold cavities are operable between "open" and "closed" conditions, the open condition permitting release of molded articles and the closed condition permitting filling of the cavities with the material to be molded. Once filled, the mold assembly is held closed while the molten material solidifies and is opened to allow removal of molded articles when the material has sufficiently solidified to retain the molded form without unacceptable distortion when the material is unsupported. Mating mold components of a mold assembly comprise a primary core component and primary cavity component, the primary core component and primary cavity component meeting along a so called "parting line" when the mold assembly is closed. A mold assembly within the press unit of a molding machine is illustrated in FIG. 1a. Filling of cavities is effected by forcing melt from an injection unit through conduits to the mold cavities. It is known in injection molding to provide valves for controlling flow of melt from the injection unit to the mold assembly.

It is known that each pair of mating mold components may define plural mold cavities. For such mold assemblies, it is known to provide conduits for conducting melt from the injection unit to at least one opening at each cavity, the opening referred to as a "gate". The conduits may comprise channels open to the parting plane of the mold components and known as sprue channels or manifolds assembled with the cavity defining members and connected to the gates by nozzles. It is known to provide a manifold extension nozzle or sprue bushing between the sprue channel or mold manifold and the injection unit nozzle, the manifold extension nozzle or sprue bushing having an inlet conforming to the shape and size of the injection unit nozzle and an outlet in sealing engagement with the sprue channel or manifold.

Improved productivity of injection molding is achieved by providing mold arrangements comprising plural mold assemblies having plural parting lines wherein the mating mold components are carried on intermediate movable platens interposed between a stationary platen and a primary movable platen defining a press or clamping unit of the injection molding machine. Such arrangements are known as "stack molds" or "dual molds" and FIG. 1b illustrates such a mold arrangement in the press unit of a molding machine. In such mold arrangements, melt is conveyed from the injection unit to the intermediate platens through conduits known as sprue bars and from the intermediate platens to the mold cavities. The intermediate platens are provided with manifolds and extension nozzles to convey melt to the cavity defining members of the mold assemblies. Each manifold is supported in a cavity of the intermediate platen so as to minimize contact between the manifold and platen, creating a so-called "floating manifold". The floating manifold arrangement reduces heat transfer between the manifold and intermediate platen to improve control of the temperature of melt within the floating manifold. Melt is conducted from the intermediate platen manifold to each mold assembly manifold extension nozzle or sprue bushing by an intermediate nozzle. Dimensions of the floating manifold and intermediate nozzle are subject to change with temperature. To insure integrity of the flow path from the floating manifold to the mold assembly, it is known to select a length for the intermediate nozzle that will maintain sufficient contact between the intermediate nozzle, the floating manifold and the manifold extension nozzle or sprue bushing to resist leakage of melt over a contemplated operating temperature range. In the event that actual operating temperatures fall outside the contemplated range, dimensional changes with temperature may result in leaks of melt or damage to components from excessive compressive forces. Hence there is a need for an intermediate nozzle that maintains flow path integrity over a broad temperature range without producing damaging compressive forces.

II. SUMMARY OF THE INVENTION

It is an object of the present invention to provide an expansion nozzle for conducting melt from a floating manifold to a mold assembly, the expansion nozzle comprising biasing means for maintaining sealing contact of a seating surface of a head of the nozzle with a mating surface of the mold assembly, axial separation of opposing surfaces of the head and a bushing flange of a bushing of the nozzle being maintained throughout an operating temperature range, the bushing having a spigot slidably received within the head, melt admitted from the manifold being conducted through the expansion nozzle to the mold assembly.

It is a further object of the present invention to provide an apparatus for conducting melt from a floating manifold to a mold assembly comprising one of an extension nozzle and sprue bushing for conveying melt to passages for distribution to mold cavities, the extension nozzle and sprue bushing having a mating surface for engagement with a seating surface of a melt conveying nozzle, the apparatus comprising an expansion nozzle conducting melt from a floating manifold to a mold assembly, the expansion nozzle comprising biasing means for maintaining sealing contact of a seating surface of a head of the nozzle with a mating surface of the mold assembly, axial separation of opposing surfaces of the head and a bushing flange of a bushing of the nozzle being maintained throughout an operating temperature range, the bushing having a spigot slidably received within the head, melt admitted from the manifold being conducted through the expansion nozzle to the mold assembly.

Further objects and advantages of the invention shall be made apparent from the accompanying drawings and the following description thereof.

In accordance with the aforesaid objects the present invention provides an expansion nozzle comprising a bushing having a bushing flange for affixing to a manifold, a spigot projecting from the bushing flange and a passage therethrough joining a nozzle inlet and an outlet, a head having a seating surface and a bore through the head and open at the seating surface, the spigot of the bushing being slidably received within the bore of the head, the outlet of the spigot being in fluid communication with the bore, means for retaining the head with the bushing, the bushing movable axially relative to the head over a range from abutting contact of opposing surfaces of the head and bushing flange to a limit of axial separation of the opposing surfaces, axial separation of the opposing surfaces of the head and bushing flange being maintained throughout an operating temperature range, and biasing means for maintaining sealing contact of a seating surface of the head with a mating surface of the mold assembly, melt admitted from the manifold to the passage being conducted through the expansion nozzle to the mold assembly. An apparatus for conducting melt from a floating manifold to a mold assembly comprising one of an extension nozzle and sprue bushing for conveying melt to passages for distribution to mold cavities, the apparatus comprising an expansion nozzle in accordance with the invention wherein the seating surface of the expansion nozzle is engaged with a mating surface of the extension nozzle or sprue bushing of the mold assembly upon mounting of a component of the mold assembly to a support for the manifold.

III. BRIEF DESCRIPTION OF THE DRAWINGS

IV. DETAILED DESCRIPTION OF THE PREFERRED EMBODIMENT

The invention shall be illustrated with reference to a preferred embodiment which shall be described in detail. It is not the intention of applicant that the invention be limited to the preferred embodiment, but rather that the invention shall be defined by the appended claims and all equivalents thereof.

Figure 1A:
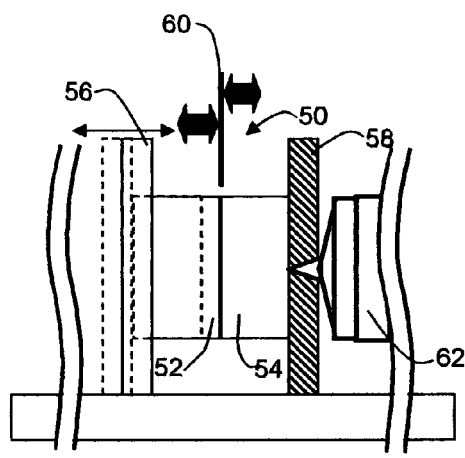
FIGS. 1a and 1b illustrate mold assemblies within press units of molding machines

Referring to FIG. 1a, a mold assembly 50 comprises a primary core component 52 and a primary cavity component 54. Primary core component 52 is supported by movable platen 56, and primary cavity component 54 is supported by stationary platen 58. Mold assembly 50 has parting line 60 where components 54 and 52 are brought into abutting engagement to mold articles. Movable platen 56 and stationary platen 58 comprise a press unit of an injection molding machine. Movable platen 56 is moved to open and dose mold assembly 50, an open position of movable paten 56 being shown in phantom (dashed line) in FIG. 1a. Melt is injected to mold assembly 50 from an injection unit 62, admitting melt through a passage in stationary platen 58 as illustrated by the cross-section thereof shown in FIG. 1a. Primary core component 52 and primary cavity component 54 advantageously define plural mold cavities (not shown). Distribution of melt to those cavities is advantageously effected by a configuration of conduits and nozzles (not shown in FIG. 1a) receiving melt at the passage through stationary platen 58 and conveying melt through the nozzles to the cavities. Advantageously, a nozzle in accordance with the invention may be applied to mold assembly 50 to insure integrity of the flow path of melt from the injection unit to a floating manifold in mold assembly 50.

Figure 1B:
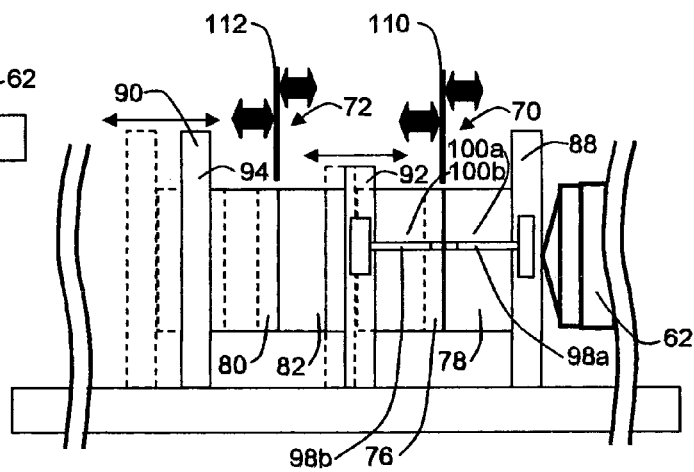

Referring to FIG. 1b, mold assemblies 70 and 72 have parting lines 110 and 112, respectively; mold assembly 70 comprises primary cavity component 76 and primary core component 78; and mold assembly 72 comprises primary core component 80 and primary cavity component 82. Movable platen 90 and stationary platen 88, together with intermediate movable platen 92 compose a press unit of an injection molding machine. Movable platen 90 and movable intermediate platen 92 are moved to open and dose mold assemblies 70 and 72, an open position of movable paten 90 and intermediate movable platen 92 is shown in phantom (dashed line) in FIG. 1b. Primary core component 78 is supported by stationary platen 88, primary core component 80 is supported by movable platen 90, and primary cavity components 82 and 76 are supported by intermediate movable platen 92. Melt is injected from injection unit 62 via sprue bar segments 98a and 98b to intermediate movable platen 92 and conducted within intermediate movable platen 92 to mold assemblies 70 and 72. Sprue bar segments 98a and 98b separate and mate with operation of the stack mold assembly. Although illustrated as meeting proximate mold parting line 110, the sprue bar segments may meet anywhere within the length between the supports for the segments. Heaters are advantageously applied to conduits of sprue bar segments 98a and 98b as well as conduits comprising intermediate platen 92 to maintain a flowable state of melt contained therein throughout a molding cycle. Notwithstanding that molding material has solidified in the mold cavities, melt remains fluid within such conduits requiring control to prevent leakage therefrom on opening of the mold assemblies. Advantageously, so called shut-off nozzles can be applied to control the flow of melt from injection unit 62 through sprue bar segments 98a and 98b so that melt is retained within the segments at times they are separated.

Figure 2:
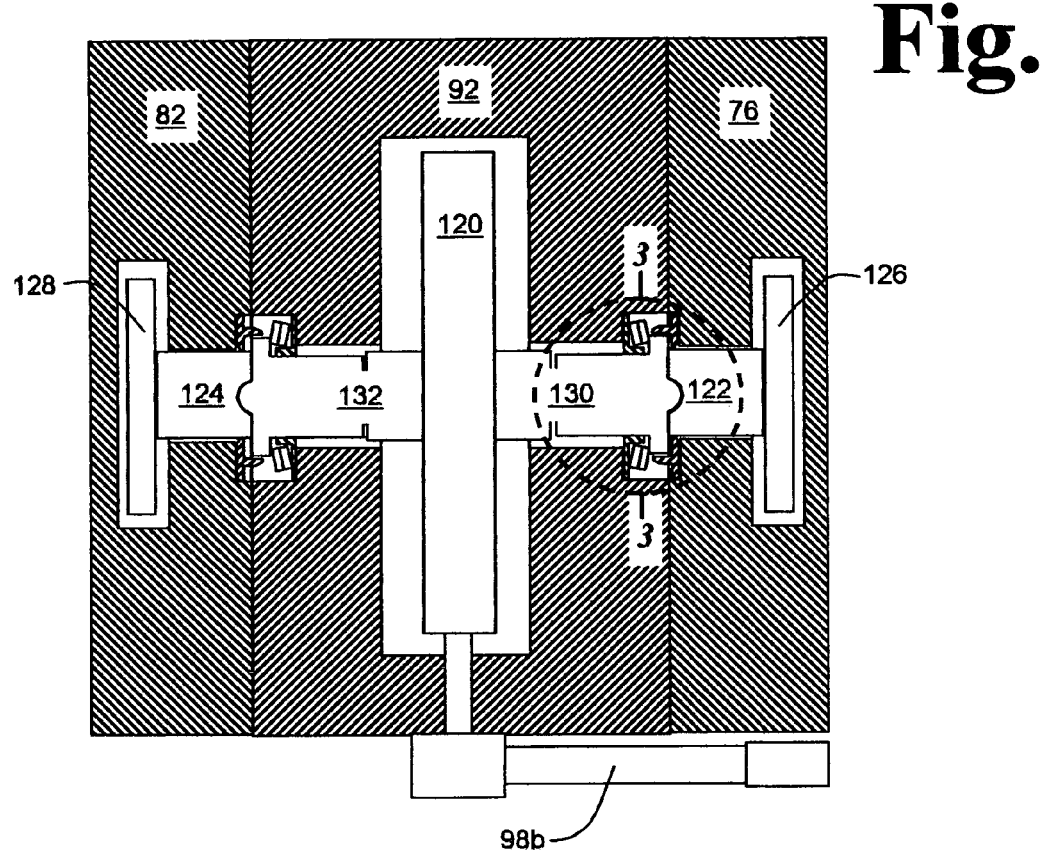
FIG. 2 is a partial sectional view of an intermediate platen and mold components showing an environment of a nozzle in accordance with the invention.
Figure 3:
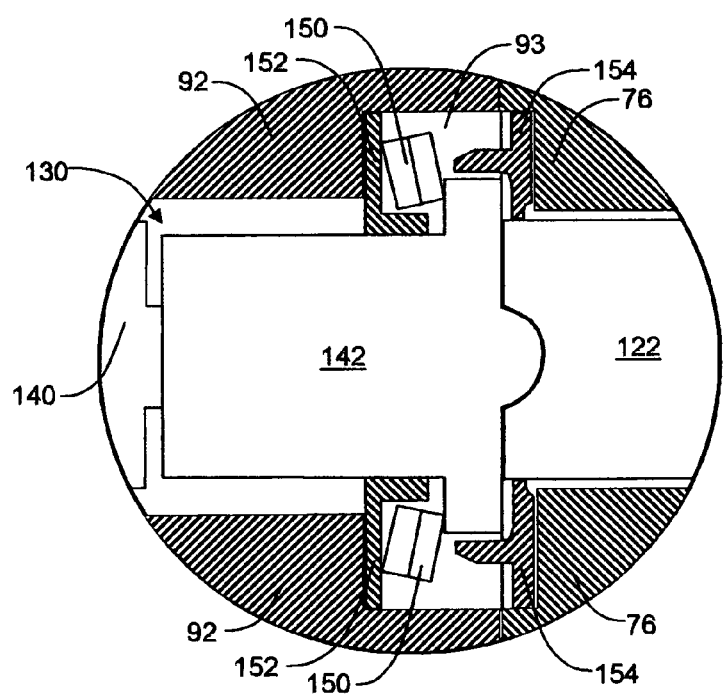
FIG. 3 is an enlarged view of a portion of the arrangement of a nozzle of FIG. 2.

Referring to FIGS. 2 and 3 a platen such as intermediate movable platen 92 to which mold components are mounted supports floating manifold 120. Floating manifold 120 is supplied with melt via conduits such as sprue bar segment 98b and distributes the melt to cavity defining mold components such as mold components 76 and 82 mounted to platen 92. Melt is received at each of mold components 76 and 82 by sprue bushings or manifold extensions nozzles such as nozzles 122 and 124, respectively. Each of nozzles 122 and 124 is abutted with mold assembly manifolds such as manifolds 126 and 128, respectively and is fastened thereto. Melt is conducted from manifold 120 to nozzles 122 and 124 via expansion nozzle assemblies 130 and 132, respectively. Each of expansion nozzle assemblies 130 and 132 comprises bushing 140, abutted to manifold 120, and head 142. Each expansion nozzle assembly is received in an opening having a counterbore 93. Bushing 140 is mounted to manifold 120 and moves with thermal expansion of manifold 120. Bushing 140 is movable axially relative to head 142 to allow for a range of thermal expansion of manifold 120 without abutting contact of opposed surfaces of bushing 140 and head 142 throughout the operating temperature range. Sealing contact of a seating surface of head 142 and a mating surface of nozzle 122 is maintained by biasing means such as disk springs 150. The seating surface of head 142 and mating surface of nozzle 122 are brought into abutting engagement upon mounting of mold components 76 and 82 to platen 92, whereby disk springs 150 are compressed. Locating rings 152 and 154 provide support for head 142 and nozzle 122, respectively, to resist bending moments in the event of axial misalignment of nozzles 130 and 122. In applications where such misalignments are not likely, one or both of locating rings 152 and 154 will be omitted. Placement of locating rings 152 and 154 provide the desired mechanical support to head 142 and nozzle 122, respectively, without direct contact of either with the walls of the openings in which each is received. Separation of head 142 and nozzle 122 from the surrounding components serves to reduce heat transfer therebetween, improving control of temperature of melt within the nozzles. The shoulder created by counterbore 93 provides a seating surface for locating ring 152. Locating ring 152 provides the reaction surface for compression of springs 150 effected by mounting of a mold component, such as mold components 76 and 82, to platen 92. In the absence of locating ring 152, a reaction surface for springs 150 may be provided by a surface of platen 92 such as the shoulder created by counterbore 93.

Figure 4:
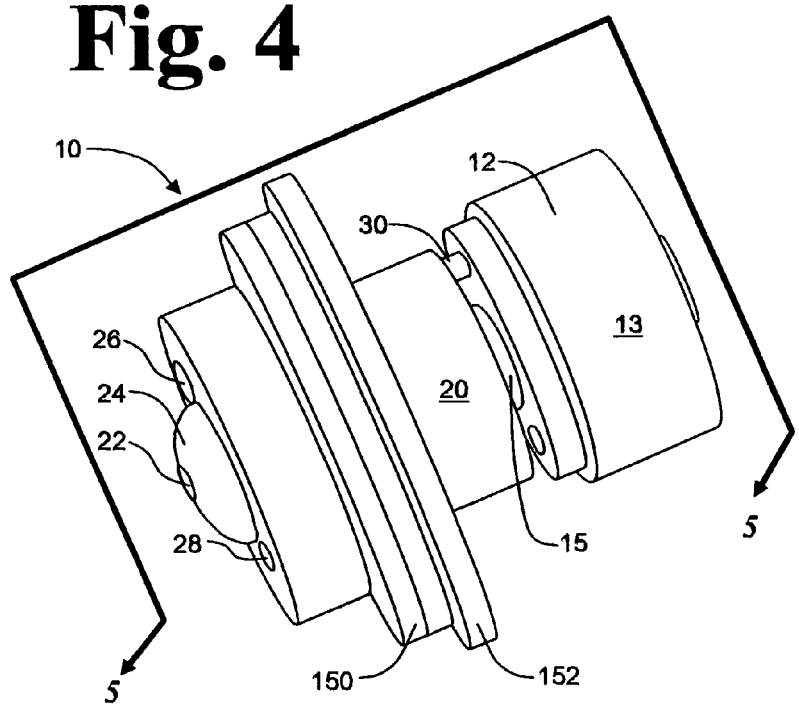
FIG. 4 is a three dimensional view of an expansion nozzle in accordance with the invention.
Figure 5:
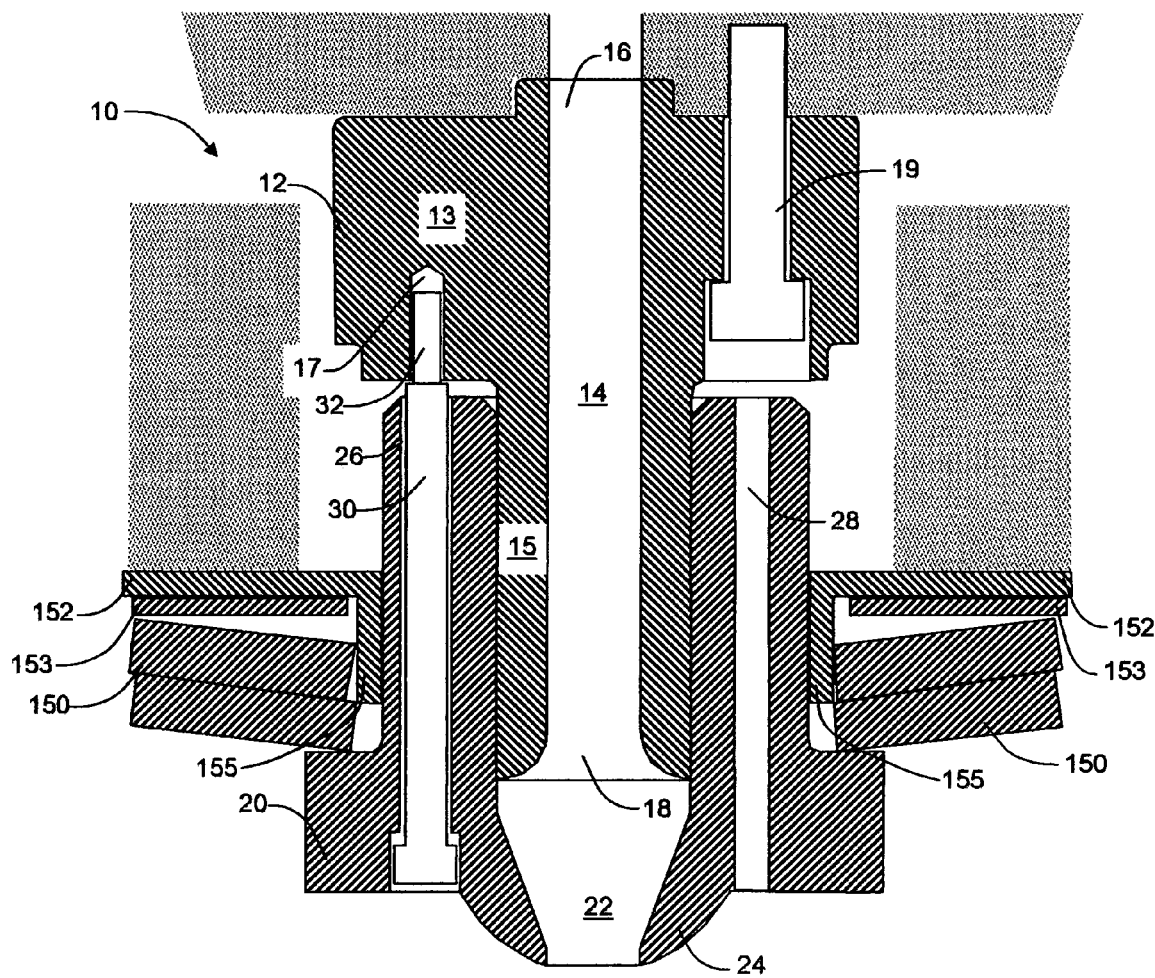
FIG. 5 is a partial sectional view of the nozzle of FIG. 4 taken along line 5-5.

Referring to FIGS. 4 and 5, expansion nozzle 10, corresponding to expansion nozzles 130 and 132 of FIGS. 2 and 3 comprises bushing 12 and head 20. Melt passage 14 through bushing 12 connects nozzle inlet 16 with outlet 18. Spigot 15 projects from bushing flange 13 and is slidably received within center bore 22 of head 20. Bushing flange 13 is affixed to a manifold, such as manifold 120 by fasteners such as bolt 19. Head 20 comprises seating surface 24, shown as a spherical surface in FIGS. 4 and 5. Head 20 is movably retained with bushing 12 by at least one fastener such as bolt 30 passing through clearance bores such as bore 26 in head 20. Threaded end 32 of each of bolts 30 is engaged with threads in a bore such as bore 17 in bushing flange 13. Bushing 12 is movable axially relative to head 20 over a range from abutting contact of opposing surfaces of head 20 and bushing flange 13 to a limit of axial separation of the opposing surfaces with a mold component mounted to engage expansion bushing 10, the limit of axial separation of opposing surfaces is determined by abutting contact of seating surface 24 with the mating surface of the mold component as illustrated by FIGS. 2 and 3 and described with reference thereto. With the mold component removed, the limit of axial separation of opposing surfaces of bushing flange 13 and head 20 is determined by retaining bolts 30. To accommodate tolerance of the depth of counterbore 93 and insure desired compression of springs 150 by the spatial arrangement of head 20 and mold assembly as described, one or more shims, such as disk shim 153, is advantageously interposed between locating ring 152 and springs 150. Sleeve 155 (FIG. 5) of locating ring 152 surrounds head 20 and provides a wear surface for sliding contact of disk springs 150 and head 20.

In use, the compression of springs 150 is set to insure a seal against melt pressure at seating surface 24 of expansion nozzle 10 and the mating nozzle without abutting contact of opposing surfaces of head 20 and bushing 12. As the floating manifold to which bushing 12 is mounted expands with increasing temperature, bushing 12 advances, reducing axial separation between opposing surfaces of bushing flange 13 and head 20. At the limit of thermal expansion of the floating manifold, axial separation of opposing surfaces of bushing flange 13 and head 20 is at its minimum. The range of axial movement of bushing 12 relative to head 20 permits use of expansion nozzle 10 for a range of thermal expansion of a floating manifold much greater than can be accommodated with a nozzle of fixed length. Throughout the range of relative movement of bushing 12 and head 20, melt admitted from a manifold to passage 14 is conducted through expansion nozzle 10 to the opening of bore 22 at seating surface 24 and therefrom to the mold assembly.

While the expansion nozzle of FIGS. 4 and 5 is shown without heaters of any kind, heating devices, such as so called "cartridge" heaters and band heaters as are known, may be applied internally within bores such as bore 28 for example, or externally to the expansion nozzle, respectively, to maintain melt retained within the nozzle in a flowable condition. Further, while the preferred embodiment has been shown and described with disk springs for biasing head 20 to the limit of axial separation from bushing flange 13, other biasing means can be substituted to achieve the function of sealing engagement of seating surface 24 against the mating surface while maintaining axial separation of opposing surfaces of head 20 and bushing flange 13. Still further, although not shown in the preferred embodiments, replaceable sealing members may be applied to expansion nozzle 10 to insure there is no leakage of melt from passage 14 out of center bore 22 at the end thereof opposite seating surface 24. Such sealing members being selected to provide a seal while permitting relative movement of spigot 15 and head 20 with thermal expansion of the manifold to which bushing flange 13 is affixed. Additionally, replaceable sealing members may be provided on the periphery of the nozzle body as well as surrounding the inlet and outlet ends thereof without departing from the spirit and scope of the invention. Other additions and substitutions of elements known to those skilled in the art may be applied to the nozzles and apparatus herein shown and described without departing from the spirit and scope of the invention as claimed.

What is claimed is:

1. An expansion nozzle for conducting melt from a floating manifold to a mold assembly, the expansion nozzle comprising a bushing having a bushing flange for affixing to a manifold, a spigot projecting from the bushing flange and a passage therethrough joining a nozzle inlet and an outlet, a head having a seating surface and a bore through the head and open at the seating surface, the spigot of the bushing being slidably received within the bore of the head, the outlet of the spigot being in fluid communication with the bore through the head, means for retaining the head with the bushing, the bushing movable axially relative to the head over a range from abutting contact of opposing surfaces of the head and bushing flange to a limit of axial separation of the opposing surfaces, axial separation of the opposing surfaces of the head and bushing flange being maintained throughout an operating temperature range, and biasing means for maintaining sealing contact of the seating surface of the head with a mating surface of the mold assembly, melt admitted from the manifold to the passage being conducted through the expansion nozzle to the mold assembly.

2. The nozzle according to claim 1 wherein the biasing means comprise at least one spring and the springs are compressed by the spatial arrangement of the expansion nozzle, manifold and mold assembly so as to provide a force sufficient to maintain the sealing contact throughout the operating temperature range.

3. The nozzle according to claim 2 further comprising at least one shim interposed between the springs and a reaction surface for the springs to achieve a desired force with the spatial arrangement at the low end of the operating temperature range.

4. The nozzle according to claim 3 further comprising a locating ring for supporting the head, the locating ring comprising the reaction surface and being fixed to a member supporting the manifold.

5. The nozzle according to claim 4 wherein the locating ring supports the head at a point to resist moments arising from axial misalignment of the expansion nozzle and mold assembly.

6. The nozzle according to claim 2 further comprising a locating ring for supporting the head, the locating ring being fixed to a member supporting the manifold and comprising a reaction surface for the springs.

7. The nozzle according to claim 6 wherein the locating ring supports the head at a point to resist moments arising from axial misalignment of the expansion nozzle and mold assembly.

8. The nozzle according to claim 1 wherein the means for retaining the head with the bushing comprises at least one bolt passing through a clearance bore in the head and threadably engaged with a bore in the bushing flange.

9. The expansion nozzle according to claim 1 further comprising heaters for maintaining melt within the nozzle in a flowable condition.

10. The nozzle according to claim 1 further comprising sealing means for preventing leakage of melt from the head at the end of the bore opposite the seating surface.

11. An apparatus for conducting melt from a floating manifold to a mold assembly, at least one component of the mold assembly be mounted to a support for the manifold, the mold assembly comprising one of an extension nozzle and sprue bushing for conveying melt to passages for distribution to mold cavities, the extension nozzle and sprue bushing having a mating surface for engagement with a seating surface of a melt conveying nozzle, the apparatus comprising an expansion nozzle comprising a bushing having a bushing flange affixed to a manifold, a spigot projecting from the bushing flange and a passage therethrough joining a nozzle inlet and an outlet, a head having a seating surface and a bore through the head and open at the seating surface, the spigot being slidably received within the bore of the head, the outlet of the spigot being in fluid communication with the bore through the head, means for retaining the head with the bushing, the bushing movable axially relative to the head over a range from abutting contact of opposing surfaces of the head and bushing flange to a limit of axial separation of the opposing surfaces, axial separation of the opposing surfaces of the head and bushing flange being maintained throughout an operating temperature range the seating surface of the head being engaged with a mating surface of the mold assembly upon mounting of a mold component to the support for the manifold and, biasing means maintaining sealing contact of the seating surface and mating surface, whereby melt admitted from the manifold to the passage is conducted through the opening of the bore at the seating surface to the mold assembly.

12. The apparatus according to claim 11 wherein the biasing means comprises at least one spring and the springs are compressed by the spatial arrangement of the expansion nozzle, manifold and mold assembly so as to provide a force sufficient to maintain the sealing contact throughout the operating temperature range.

13. The apparatus according to claim 12 further comprising at least one shim interposed between the springs and a reaction surface for the springs to achieve a desired force with the spatial arrangement at the low end of the operating temperature range.

14. The apparatus according to claim 13 further comprising a locating ring for supporting the head, the locating ring comprising the reaction surface and being fixed to a member supporting the manifold.

15. The apparatus according to claim 14 wherein the locating ring supports the head at a point to resist moments arising from axial misalignment of the expansion nozzle and mold assembly.

16. The apparatus according to claim 12 further comprising a locating ring for supporting the head, the locating ring being fixed to a member supporting the manifold and comprising a reaction surface for the springs.

17. The apparatus according to claim 16 wherein the locating ring supports the head at a point to resist moments arising from axial misalignment of the expansion nozzle and mold assembly.

18. The apparatus of claim 11 wherein the means for retaining the head with the bushing comprises at least one bolt passing through a clearance bore in the head and threadably engaged with a bore in the bushing flange.

19. The apparatus of claim 11 further comprising heaters for maintaining melt within the nozzle in a flowable condition.

20. The apparatus of claim 11 further comprising sealing means for preventing leakage of melt from the head at the end of the bore opposite the seating surface.

* * * * *